United States Patent [19]
Ash et al.

[11] Patent Number: 6,065,720
[45] Date of Patent: May 23, 2000

[54] MANUFACTURE OF AIRCRAFT

[75] Inventors: Geoffrey J. Ash; Robert Brown, both of Warton, United Kingdom

[73] Assignee: British Aerospace Public Limited Company, Farnborough, United Kingdom

[21] Appl. No.: 09/144,263

[22] Filed: Aug. 31, 1998

[30] Foreign Application Priority Data

Sep. 4, 1997 [GB] United Kingdom .................. 9718656

[51] Int. Cl.[7] .................................................. B64C 1/00
[52] U.S. Cl. ..................... 244/120; 244/118.2; 244/124
[58] Field of Search ............................. 244/120, 117 R, 244/118.2, 124

[56] References Cited

U.S. PATENT DOCUMENTS

| | | | |
|---|---|---|---|
| 3,640,491 | 2/1972 | Harrison | 244/117 R |
| 4,379,533 | 4/1983 | Caldwell et al. | 244/120 |
| 4,417,708 | 11/1983 | Negri | 244/124 |
| 4,449,679 | 5/1984 | McComas | 244/118.2 |
| 4,736,910 | 4/1988 | O'Quinn et al. | 244/120 |
| 5,897,078 | 4/1999 | Burnham et al. | 244/120 |

FOREIGN PATENT DOCUMENTS

| | | |
|---|---|---|
| 4 131 569 | 3/1993 | Germany . |
| 4 218 197 | 12/1993 | Germany . |
| 0398069 | 9/1933 | United Kingdom . |
| 0515562 | 12/1939 | United Kingdom . |
| 0528911 | 11/1940 | United Kingdom . |
| 0755288 | 8/1956 | United Kingdom . |
| 0873679 | 7/1961 | United Kingdom . |
| 1027918 | 4/1966 | United Kingdom . |
| 86/03172 A1 | 5/1986 | WIPO . |
| 87/03265 A1 | 4/1987 | WIPO . |
| WO 97/22516 | 6/1997 | WIPO . |

OTHER PUBLICATIONS

*Flight International*, Jun. 11–17, 1997 (UK) Max Kingsley–Jones, "Europe's long–range twin", pp. 135–139, especially p. 138 "Ten Frames Shorter".

*Primary Examiner*—J. Woodrow Eldred
*Attorney, Agent, or Firm*—Nixon & Vanderhye P.C.

[57] ABSTRACT

A method of manufacture of an aircraft comprising the manufacture of a range of interconnectable demountable structural modules and assembly of one of a plurality of aircraft variants by the selection and assembly of a predetermined set of said structural modules.

11 Claims, 2 Drawing Sheets

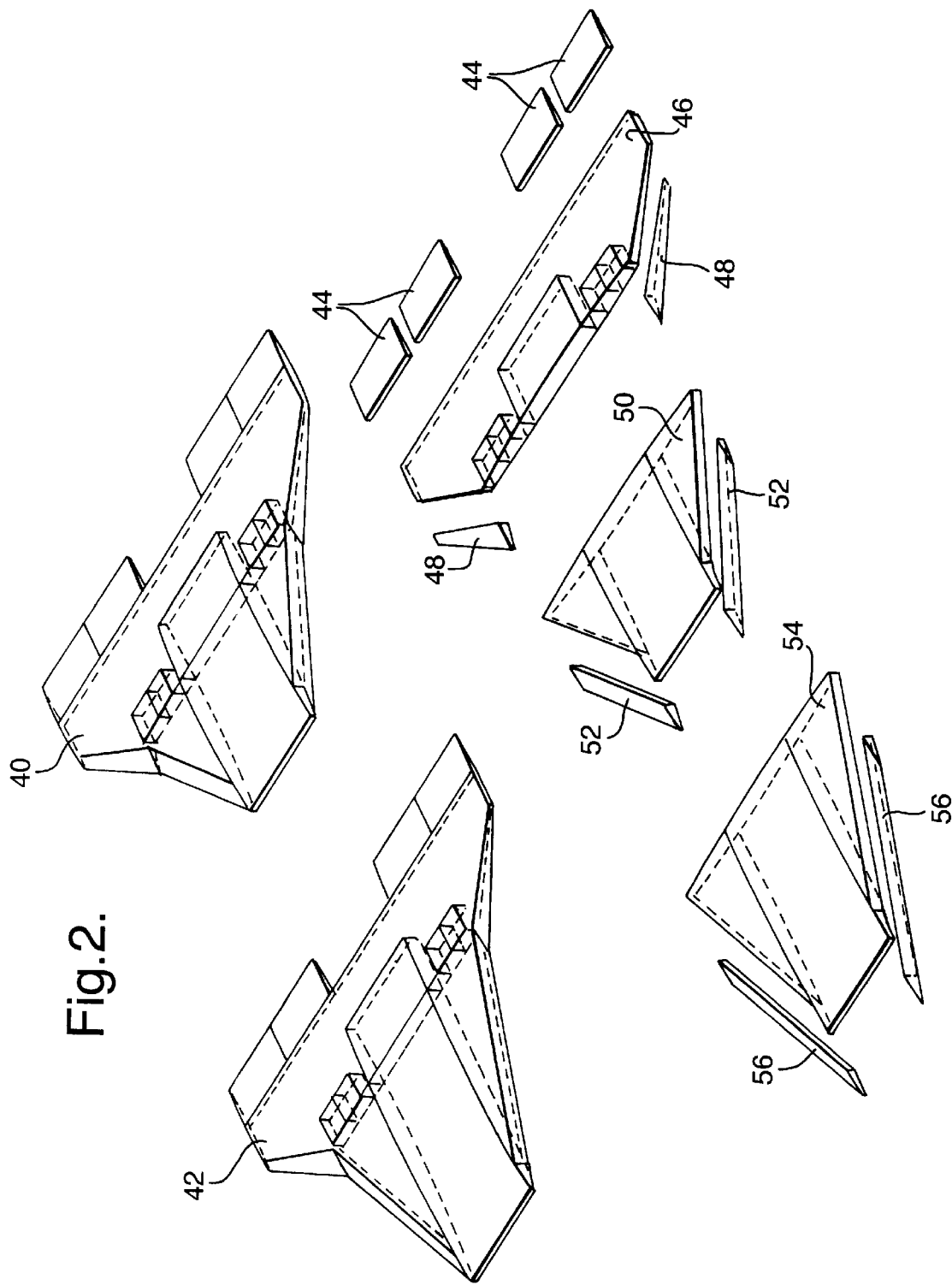

MANUFACTURE OF AIRCRAFT

THE FIELD OF THE INVENTION

This invention relates to the field of aircraft manufacture, and more specifically to the field of modular manufacture of aircraft which can be readily modified and adapted to meet any one of a variety of flight requirements.

BACKGROUND OF THE INVENTION

Traditional design techniques and trends within the aircraft industry have led designers to produce aircraft with profiles which use double curvature panels to describe their external lines. The use of such complicated external shapes in the design of both military and civil aircraft has resulted in the need for elaborate and therefore expensive tooling used in both the manufacture of detailed parts and final assembly.

Within the military aircraft industry, traditional design drivers have been for operational performance improvements, however, more recently a switch in emphasis has been towards providing an effective balance between performance improvement and life cycle cost reductions. This new direction in aircraft design has enabled engineers to study the possibilities of eliminating the familiar double curvature airframes and additionally has provided for research into possible new methods of manufacture and assembly for faceted structures.

One of the prime cost driving elements associated with the final assembly of modern combat aircraft is that relating to the installation of aircraft systems. The integration and final assembly of environmental control systems (ECS), engine systems, fuel systems, life support systems and avionics is arguably the most time consuming and expensive area of final assembly and therefore much research has been conducted into the possible reduction in complexity of such systems in combination with the introduction of faceted fuselage outer profiles.

Conventional methods of aircraft manufacture have required a vast range of specialized machining processes to cope with the assembly of double curvature structure and panelling along with the requirements for engineering practices such as shimming or adjustment, contour cutting, drilling and adjustment of details during the assembly phase of aircraft production. A further product of double curvature fuselage designs is the requirement for handed components, and in most cases the use of a wide range of fasteners to cater for the interface requirements of such complex shaped designs.

Our invention provides a method of manufacture for aircraft which substantially reduces the need for high manpower requirements on aircraft final assembly by the simplification of both the manufacturing and integration processes related to both structure and aircraft systems.

SUMMARY OF THE INVENTION

Accordingly there is provided a method of manufacture of an aircraft comprising the manufacture of a range of interconnectable demountable structural module means for selectable assembly of one of a plurality of aircraft variants by the selection and assembly of a pre-determined set of said structural modules.

The structural module means manufactured may include interchangeable common module means for providing identical aircraft facilities as required at one or more positions on the aircraft. For example the common module means may comprise modular control surface means for providing aerodynamic control forces at a selected one of a plurality of wing or tail positions. In another example the common module means may comprise modular leading edges for providing reduced drag airflow at a selected one of wing or tail leading edge locations.

The structural module means manufactured may include interchangeable systems module means for providing selected system functions to the aircraft comprising modular structure housing the selected system equipment. For example the system module means may comprise modular environmental control system means for providing an aircraft with an environmental control system at a chosen location on the aircraft.

The structural module means manufactured preferably have structure substantially formed from planar panels. The panels may be joined together to provide a faceted external shape and the modules when assembled on the aircraft may then give the aircraft an overall planar, faceted surface having stealth characteristics. Such a construction of the modules has other benefits for example ease of manufacture and installation or removal, storage and handling.

The method of manufacture of aircraft may include the steps of manufacturing aircraft wing modules comprising at least:

manufacturing a rear structural wing element and an associated plurality of interchangeable, demountable, modular control surfaces, manufacturing at least two forward structural wing elements each designed to meet a flight requirement different from the flight requirements of the other forward structural wing element or elements and an associated plurality of pairs of interchangeable, demountable, modular leading edges, and selecting one of said at least two forward structural wing elements and attaching it to said rear structural wing element.

BRIEF DESCRIPTION OF THE DRAWINGS

A specific embodiment of the invention will now be described by way of example only with reference to the following drawings:

FIG. 2 shows an exploded modular breakdown view of two aircraft wings in accordance with the invention.

DETAILED DESCRIPTION OF THE DRAWINGS

Figure 1:
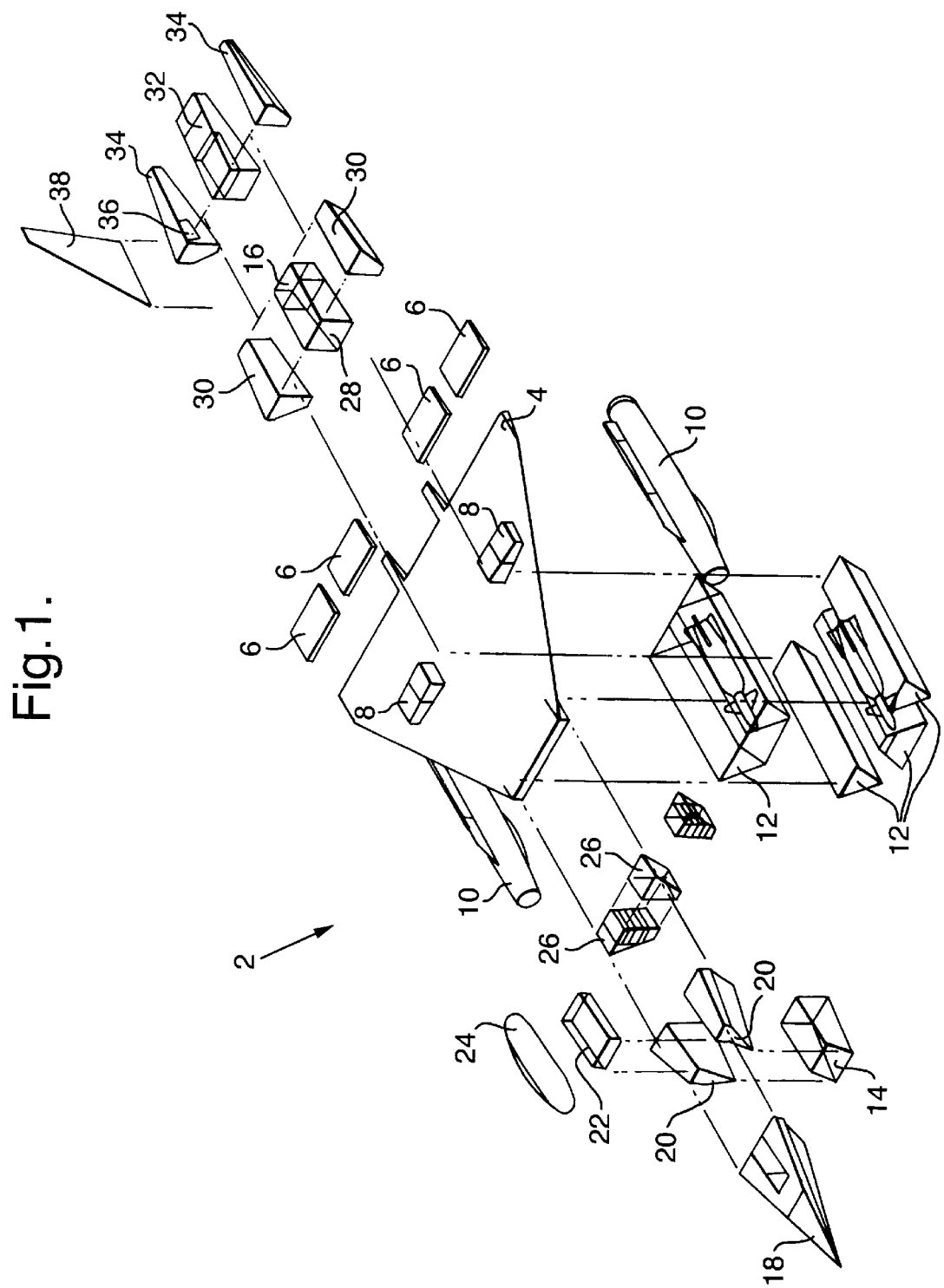
FIG. 1 shows an exploded modular breakdown view of an aircraft in accordance with the invention.

In FIG. 1, an aircraft 2 is shown broken down into its constituent modular elements. The modular wing 4, which forms the main structure element of the aircraft, is shown having modular control surfaces 6 and structural interface locations 8 for the mounting of the podded modular engine units 10. Additionally, the weapons modules 12 are designed to be assembled to the underside of the wing module 4 thereby forming the center section structure of said wing 4. The nose undercarriage unit 14 is designed to be located between the nose cone module 18, and cockpit surround structure 20, the environmental control system module 22 and ultimately the cockpit canopy 24. The avionics systems modules are contained within unit 26 shown forming the interface between the forward end of the structural center section of the wing 4 and the rear of the cockpit area structure 20.

Aft of the wing module 4 the rear undercarriage module 28 is shown bounded by the hydraulics module 16 and two rear fuselage structural members 30. Aft of the hydraulics module 16 is shown a rear weapons module 32 bounded by two tail section structural members 34 and the tail fin unit 38. Additionally, the starboard tail structural member 34 is shown containing the auxiliary power unit module 36.

FIG. 2 shows the break down of the modular construction of two wing units for an aircraft in accordance with the invention, namely, a small wing area platform 40 and a larger wing area platform 42. Both the small and the large wing area platform modules have a number of common elements, namely, modular control surfaces 44 the rear structural element of the wing 46 and associated leading edges 48.

For the assembly of a small wing area platform 40 a forward structural section 50 and associated leading edges 52 are used, whereas for the production of a large wing area platform the extended forward structural section 54 and associated leading edge units 56 are utilized.

Using the modular aircraft design approach engineers are able to select common modular functions, such as for example hydraulics module 16 and the environmental control system module 22 such that they can be used on a wide range of aircraft without being limited to the specific detailed design required for the installation of such modules in conventional double curvature fuselages. Additionally engine modules 10 can be designed to accommodate a wide range of engine types, but the interface connections to the wing module 4 will be maintained thereby allowing the rapid assembly and/or disassembly of the engine.

When an aircraft designer is considering differing roles for an aircraft type, then using the modular structure and modular systems approach, the design of aircraft variants is made an immeasurably simpler task. For example, if an aircraft type for operational reasons requires either a longer range and/or an increased take off weight or weapons load, then using the modular design approach the common features of the smaller wing aircraft (i.e. 44, 46, 48) can be utilized in combination with a larger forward structural area for the wing 54, 56 thereby producing a larger wing lift area, an increased wingborne fuel capacity, a resulting longer fuselage and an increased size aperture for the attachment of a range of weapons modules 12.

Applying the principle of interchangeability to modular aircraft design not only reduces the time required for assembly of aircraft but also provides for the repair and maintenance of such aircraft built in accordance with the invention to be greatly simplified. For example should there by an environmental control system failure or problem, by housing all of the essential features of the environmental control in module 16 should it be required, then that individual module can be disconnected from the aircraft and replaced in situ thereby avoiding the problems associated with conventional combat aircraft whereby the removal of major environmental control components would require the disassembly of areas of structure and the removal of individual components.

It can be seen that the design permutations are numerous when using such a design approach thereby providing a comprehensive collection of aircraft types each being specifically tailored to meet particular mission criteria. Such design and manufacturing methods can just as easily be applied to civil aircraft construction, thereby offering increased flexibility across a range of passenger and transport aircraft.

What is claimed is:

1. A method of manufacture of an aircraft comprising the manufacture of a range of interconnectable demountable structural module means for selectable assembly of one of a plurality of aircraft variants by the selection and assembly of a predetermined set of said structural modules, wherein the structural module means manufactured have structure substantially formed from planar panels, wherein the panels are joined together to provide a faceted external shape and the modules when assembled on the aircraft give the aircraft an overall planar, faceted surface.

2. A method of manufacture of an aircraft as claimed in claim 1 and wherein the structural module means manufactured include interchangeable common modules providing identical aircraft facilities at least one position on the aircraft.

3. A method of manufacture of an aircraft as claimed in claim 2 and wherein the common modules comprise modular control surface means for providing aerodynamic control forces at a selected one of a plurality of wing or tail positions.

4. A method of manufacture of an aircraft as claimed in claim 2 and wherein the common module means comprise modular leading edges for attachment at a selected one of wing and tail leading edge locations.

5. A method of manufacture of an aircraft as claimed in claim 1 and wherein the structural module means manufactured may include interchangeable systems module means for providing selected system functions to the aircraft comprising modular structure housing the selected system equipment.

6. A method of manufacture of an aircraft as claimed in claim 5 and wherein the system module means comprise modular environmental control system means for providing the aircraft with an environmental control system at a chosen location on the aircraft.

7. A method of manufacture of an aircraft as claimed in claim 1 including the steps of:
    manufacturing a rear structural wing element and an associated plurality of interchangeable, demountable, modular control surfaces;
    manufacturing at least two forward structural wing elements each designed to meet a flight requirement different from the flight requirement of the other forward structural wing element or elements and an associated plurality of pairs of interchangeable, demountable, modular leading edges, and;
    selecting one of said at least two forward structural wing elements and attaching it to said rear structural wing element.

8. A method of manufacture of an aircraft as claimed in claim 7 and wherein the structural module means have structure substantially formed from planar panels.

9. A method of manufacture of an aircraft as claimed in claim 1, wherein the structural module means manufactured include interchangeable common modules which are capable of being located at more than one position on the aircraft.

10. A method of manufacture of an aircraft comprising the manufacture of a range of interconnectable demountable structural module means for selectable assembly of one of a plurality of aircraft variants by the selection and assembly of a predetermined set of said structural modules, including the steps of:
    manufacturing a rear structural wing element and an associated plurality of interchangeable, demountable, modular control surfaces;

manufacturing at least two forward structural wing elements each designed to meet a flight requirement different from the flight requirement of at least one other forward structural wing element and an associated plurality of pairs of interchangeable, demountable, modular leading edges, and;

selecting one of said at least two forward structural wing elements and attaching it to said rear structural wing element, wherein the structural module means have structure substantially formed from planar panels, and wherein the panels are joined together to provide a faceted external shape and the modules when assembled on the aircraft give the wings of the aircraft an overall planar, faceted surface.

11. A method of manufacture of an aircraft comprising the manufacture of a range of interconnectable demountable structural modules for selectable assembly of one of a plurality of aircraft variants by the selection and assembly of a predetermined set of said structural modules, wherein the structural modules manufactured have structure substantially formed from planar panels, wherein the panels are joined together to provide a faceted external shape and the modules when assembled on the aircraft give the aircraft an overall planar, faceted surface, wherein the panels are joined together to provide a faceted external shape and the modules when assembled on the aircraft give the aircraft an overall planar, faceted surface.

* * * * *